United States Patent

Sato et al.

[11] Patent Number: 5,880,422
[45] Date of Patent: Mar. 9, 1999

[54] SHIFT LEVER DEVICE

[75] Inventors: Yasuhiro Sato; Takashi Sakamaki; Masayuki Ito, all of Tokyo, Japan

[73] Assignee: Niles Parts Co., Ltd., Japan

[21] Appl. No.: 902,080

[22] Filed: Jul. 29, 1997

[30] Foreign Application Priority Data

Jul. 30, 1996 [JP] Japan .................................. 8-215912

[51] Int. Cl.$^6$ .................................................... G05G 1/06
[52] U.S. Cl. ...................................... 200/61.88; 74/473.3
[58] Field of Search .......................... 220/61.88; 74/473.3, 74/473.12, 335

[56] References Cited

U.S. PATENT DOCUMENTS

| 3,795,156 | 3/1974 | Neuscheler ......................... 74/473.3 X |
| 5,706,701 | 1/1998 | Murakami ............................ 200/61.88 |
| 5,727,423 | 3/1998 | Torii et al. ........................ 200/61.88 X |

FOREIGN PATENT DOCUMENTS

SHO64-21420  2/1989  Japan .

Primary Examiner—Renee S. Luebke
Attorney, Agent, or Firm—Ronald P. Kananen; Rader, Fishman & Grauer

[57] ABSTRACT

A shift lever 1 having an improved structure for holding a conductor wire 3 in position during assembly. The conductor wire 3 has one end 31 thereof disposed in a knob 2 of the shift lever 1. The conductor wire 3 is fitted with a terminal 41 to provide an electrical connection to a switch 4. The conductor wire 3 has a base portion 33 extending from a bent portion 32 formed in an intermediate portion toward the other end 34 of the conductor wire 3. The knob 2 has a conductor wire support hole 21 provided along the base portion 33 of the conductor wire 3. The positioning of the base portion 33 of the conductor wire 3 is performed by inserting a part 51 of a forming die 5 into the conductor wire support hole 21 when forming a flesh portion 23 of the shift lever 1. The shift lever 1 according to the invention holds the conductor wire 3 in a normal position for assembly when the conductor wire 3 is fitted with the terminal 41 of the switch 4 to provide an electrical connection.

9 Claims, 4 Drawing Sheets

SHIFT LEVER DEVICE

BACKGROUND OF THE INVENTION

1. Field of the Invention

The present invention relates generally to a shift lever device having a switch provided on a knob thereof and, more particularly, to a shift lever device adapted to fit a terminal of a switch to a conductor wire provided on the shift lever to carry out electrical connection.

2. Description of the Related Art

A conventional shift lever device is disclosed, for example, in Japanese Provisional Utility Model Publication (Kokai) No. S62-21420. This conventional shift lever device comprises a conductor wire provided in a shift lever to which a switch terminal is fitted to perform electrical connection. FIGS. 5(a) and 5(b) show sectional views of this conventional shift lever device.

In the conventional shift lever device shown in FIGS. 5(a) and 5(b), a conductor wire 3 is inserted in a direction of the arrow A shown in FIG. 5(a) into a skeleton section 22 of a knob 2, and the conductor wire 3 at one end 31 is fitted with a terminal 41 of a switch 4, as shown in FIG. 5(b), thereby providing electrical connection. The portion denoted by reference character 24 is a recessed portion, in which the wall is removed from the skeleton section 22, so that the tip of the terminal 41 fitted with the conductor wire 3 is prevented from being abutted against the skeleton section 22. Also, the portion represented by reference character 25 is a groove through which the conductor wire 3 is guided to the recessed portion 24. The recessed portion 24 and the groove 25 are both formed when forming the skeleton section 22.

In the conventional shift lever device, however, the conductor wire 3 may be retracted, for example, from a position shown by the dashed line B in FIG. 5(a) to a position shown by the solid line C, when assembling the switch 4 onto the knob 2. If the switch 4 is depressed in a direction of the arrow D to fit the terminal 41 to the conductor wire 3 when the conductor wire 3 is retracted, the one end 31 of the conductor wire 3 is deformed into the recessed portion 24, as shown in FIG. 5(a), thus making normal assembly difficult.

SUMMARY OF THE INVENTION

It is an object of the present invention to provide a shift lever device that solves the problems associated with the conventional shift lever device described above.

More specifically, it is an object of the present invention to provide a shift lever device for a vehicle wherein, when a terminal of a switch is fitted to a conductor wire provided in the shift lever device to perform electrical connection therebetween, the conductor wire is held in a normal position so as to carry out normal assembly.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a switch lever device is provided comprising a conductor wire provided therein with one end of the conductor wire disposed in a knob, and a switch electrically connected to the conductor wire by fitting a terminal to the one end of the conductor wire. The shift lever device is characterized by the conductor wire having a bent portion formed by bending an intermediate portion thereof, and a base portion extending from the bent portion toward the other end of the conductor wire, while the knob has a conductor wire support hole provided along the base portion, so that the base portion is positioned by the conductor wire support hole.

Also, the knob of the shift lever device according to the present invention has a skeleton section having the conductor wire support hole and a flesh section formed so as to wrap over the skeleton section, wherein a part of a forming die can be inserted into the conductor wire support hole to position the base portion when forming the flesh section.

Further, the present invention provides a shift lever device wherein a depth dimension L1 of the conductor wire support hole lies in a relation of L1>L2 with respect to a length dimension L2 of a part of the forming die.

BRIEF DESCRIPTION OF THE DRAWINGS

The present invention will become more clearly appreciated as the disclosure of the invention is made with reference to the accompanying drawings. In the drawings:

FIGS. 4(a) and 4(b) are outside views of the shift lever device shown in FIG. 1, wherein FIG. 4(a) is a top plan view, FIG. 4(b) is a front view, FIGS. 5(a) and 5(b) show views of a conventional shift lever device, wherein FIG. 5(a) is a partly enlarged sectional view, and FIG. 5(b) is a sectional view of a conductor wire fitted with a terminal of a switch.

DETAILED DESCRIPTION OF THE PREFERRED EMBODIMENT

Figure 1:
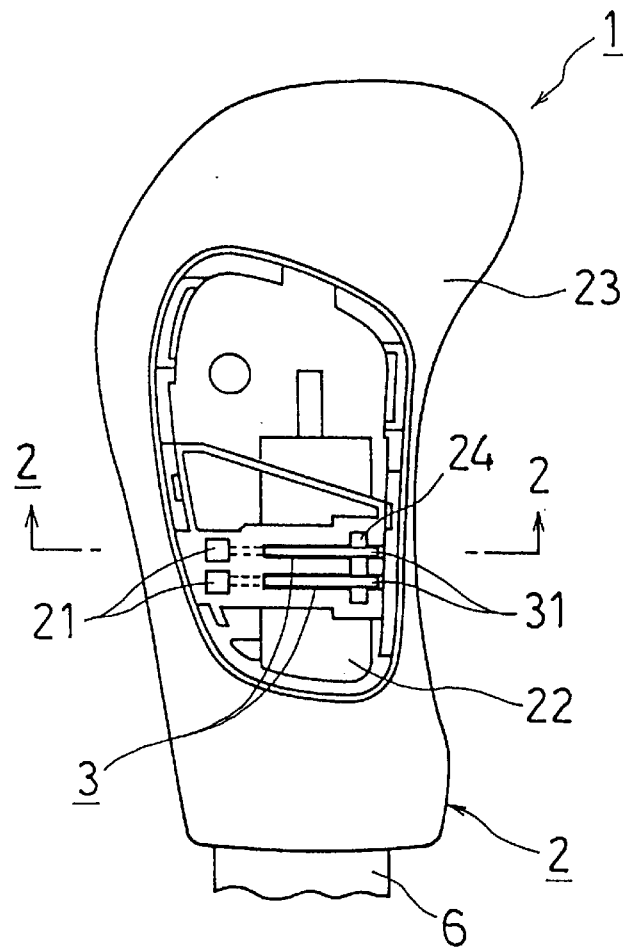
FIG. 1 is a front view showing an essential part of a shift lever device according to a preferred embodiment of the present invention.
Figure 2:
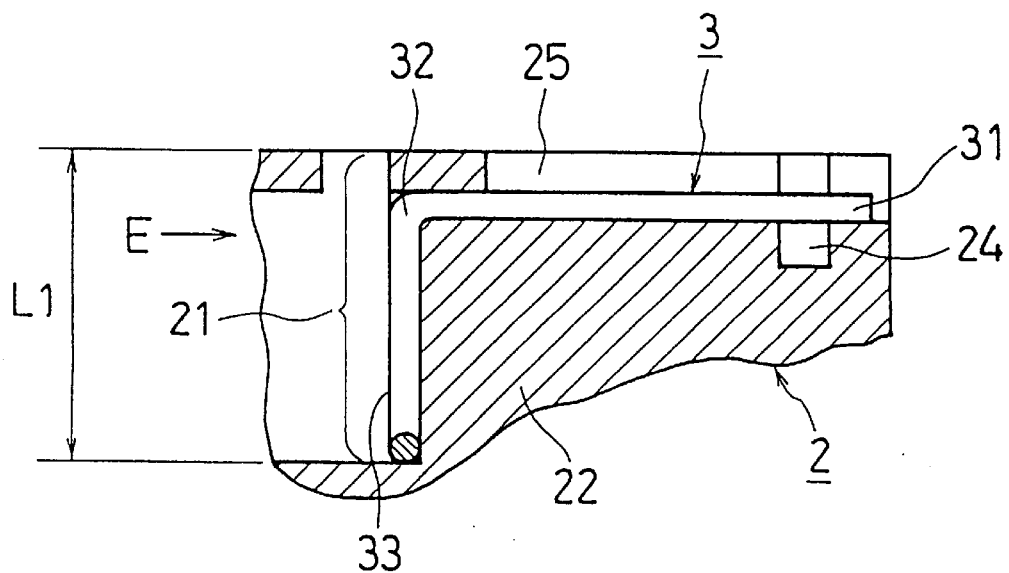
FIG. 2 is a partly enlarged sectional view taken in a direction of the arrow 2—2 shown in FIG. 1.

A preferred embodiment of a shift lever 1 according to the present invention will now be explained with reference to FIGS. 1 to 4 of the drawings.

The shift lever 1 according to the present invention comprises a knob 2 and a lever 6. The knob 2 is formed by a skeleton section 22, a flesh section 23, and a skin section 26 wrapped on an outer side of the flesh section 23. The knob 2 has a switch 4 on its outer side for setting an over-drive mode or the like, and a shift button to disengage a detent pin from a detent plate in order to tilt the lever 6 to a predetermined position. The knob 2 has a conductor wire 3 on its inner side for communicating operating signals from the switch 4.

The skeleton section 22 is a member formed by a hard synthetic resin having a conductor wire support hole 21, a recessed portion 24, and a groove 25 formed in one body. The skeleton section 22 is covered at an outer periphery by the flesh section 23 formed of vinyl chloride by the use of a forming die 5. The forming die 5 can position a base portion 33 of the conductor wire 3 by inserting a part 51 of the forming die 5 into a conductor wire support hole 21. The conductor wire 3 has a bent portion 32 formed by bending an intermediate portion thereof. The base portion 33 extends from the bent portion 32 toward the other end 34 of the conductor wire 3. Also, the conductor wire support hole 21 is provided along the base portion 33 of the conductor wire 3 so that the positioning of the base portion 33 is carried out using the conductor wire support hole 21, as described below.

A procedure will now be explained for fitting the skeleton section 22 of the shift lever 1 with the conductor wire 3 before covering the skeleton section 22 with the flesh section 23, whereby a terminal 41 of the switch 4 can later be reliably fitted to the conductor wire 3. As a first step, the conductor wire 3 is inserted into the skeleton section 22 of the knob 2 in a direction of the arrow E shown in FIG. 2, and guided by the groove 25 to the recessed portion 24. Then, as a second step, the forming die 5 is set while inserting the part 51 of the forming die 5 into the conductor wire support hole 21, as shown by the dashed line F in FIG. 3. Thereupon, the conductor wire 3 is depressed in a direction shown by the arrow E in FIG. 2 by the part 51 of the forming die 5.

Figure 3:
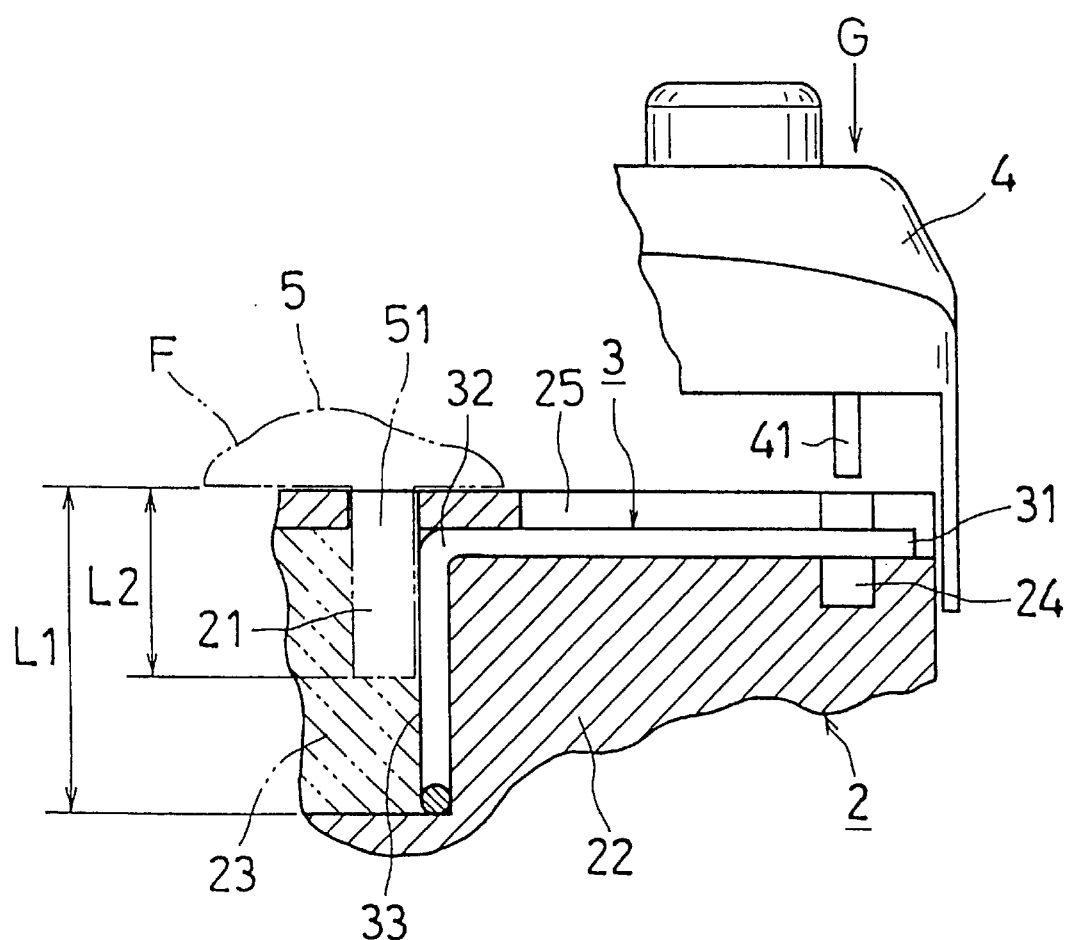
FIG. 3 is an enlarged sectional view of the portion of a shift lever device shown in FIG. 2 formed with a flesh section.
Figure 4A:
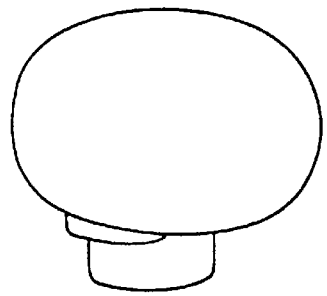
Figure 4B:
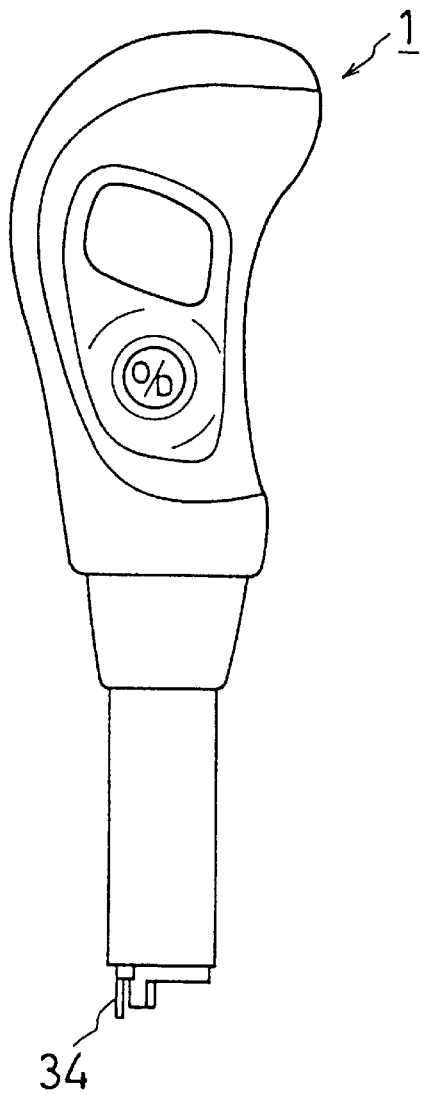
Figure 4C:
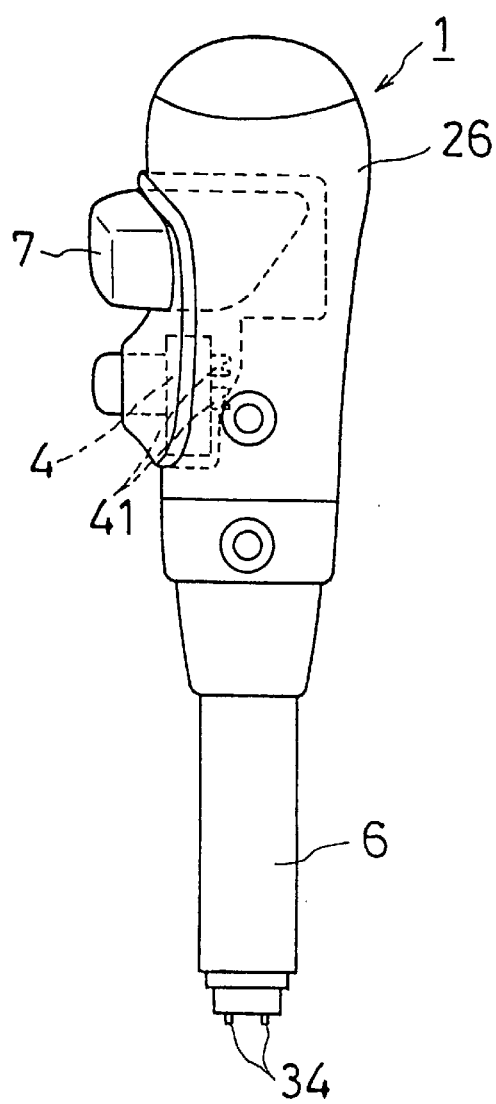
FIG. 4(c) is a side view.
Figure 5A:
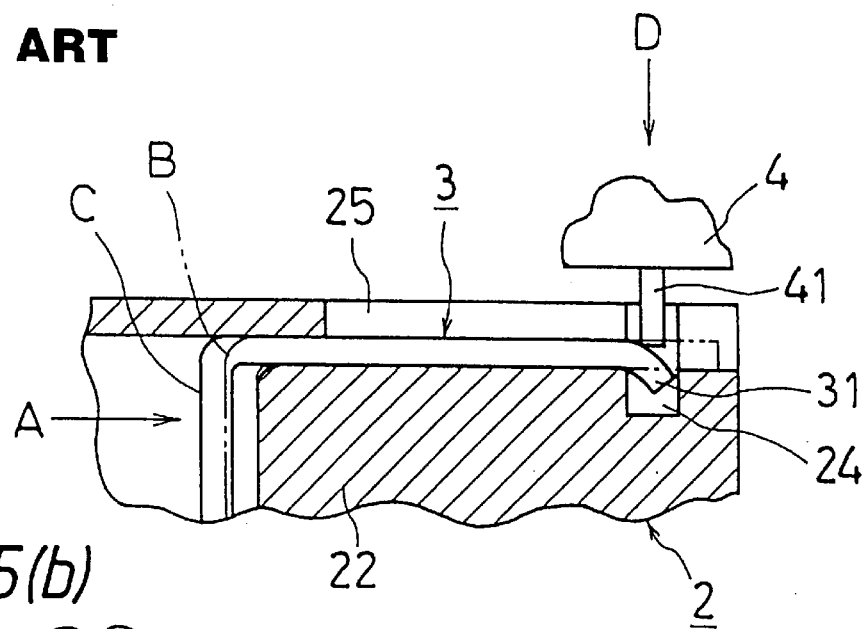
Figure 5B:
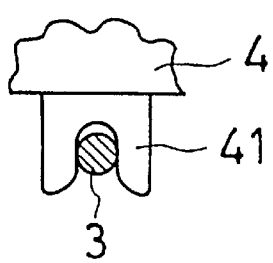

Then, as a third step, a flesh section 23 is formed by injecting a molten resin of a vinyl chloride into an inside of the forming die 5, whereby the outer periphery of the skeleton section 22 is covered by the flesh section 23. The depth dimension L1 of the conductor wire support hole 21 is set in a relation of L1>L2 with respect to a length dimension L2 of the part 51 of the forming die 5 so that the molten resin for forming the flesh section 23 flows also into the conductor wire support hole 21 against the base portion 33 of the conductor wire 3. As a result, the conductor wire 3 is fixed in a normal position, as shown in FIG. 3, due to solidification by cooling of the flesh section 23.

Then, as a fourth step, a shift button 7 is attached to the skeleton section 22. One end 31 of the conductor wire 3, in a recessed portion 24 where the wall is removed from the skeleton section 22, is fitted with the terminal 41 of the switch 4, thereby performing electrical connection. After carrying out the above steps, a skin section 26 is wrapped around the periphery of the flesh section 23.

As described above, the shift lever device according to the present invention comprises a conductor wire provided with one end thereof disposed in a knob, and a switch electrically connected to the conductor wire by fitting a terminal to the one end of the conductor wire. The shift lever device is characterized by the conductor wire having a bent portion formed by bending an intermediate portion thereof and a base portion extending from the bent portion toward the other end of the conductor wire, and the knob having a conductor wire support hole provided along the base portion so that the base portion is positioned by the conductor wire support hole. It is therefore possible to hold a conductor wire in a shift lever of a vehicle in a normal position to perform normal assembling when the conductor wire is fitted with a terminal of a switch for carrying out electrical connection.

Also, the knob has a skeleton section in which the conductor wire support hole is formed, and a flesh portion formed so as to wrap over the skeleton section, wherein a part of a forming die can be inserted into the conductor wire support hole to position the base portion when forming the flesh section. Accordingly, the base portion of the conductor wire 3 can be held in position by the forming die when forming the flesh section.

Further, a depth dimension L1 of the conductor wire support hole lies in a relation of L1>L2 with respect to a length dimension L2 of the part 51 of the forming die 5. Accordingly, the molten resin for forming the flesh section flows in the conductor wire support hole so that the conductor wire is positioned in a normal position as the flesh section is solidified by cooling.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A combination of a shift lever device (1) and a forming die (5), said shift lever device (1) comprising:

a conductor wire (3) provided with one end (31) of the conductor wire (3) disposed in a knob (2) of the shift lever device (1), and a switch (4) electrically connected to the conductor wire (3) by fitting a terminal (41) to the one end (31) of the conductor wire (3);

a bent portion (32) formed in the conductor wire (3) by bending an intermediate portion of the conductor wire (3), and a base portion (33) extending from the bent portion (32) toward the other end (34) of the conductor wire (3), the knob (2) having a conductor wire support hole (21) provided along the base portion (33) of the conductor wire (3); and a part of said forming die is received in said conductor wire support hole and engages and positions the base portion of the conductor wire while the shift lever device is being formed.

2. The combination according to claim 1, wherein the knob (21) has a skeleton section (22) having the conductor wire support hole (21) formed therein, and a flesh section (23) formed so as to wrap over the skeleton section (22), wherein the part (51) of the forming die (5) is inserted into the conductor wire support hole (21) to position the base portion (33) of the conductor wire (3) when forming the flesh section (23).

3. The combination according to claim 2, wherein a depth dimension L1 of the conductor wire support hole (21) lies in a relation of L1>L2 with respect to a length dimension L2 of the part (51) of the forming die (5).

4. A shift lever device having an improved structure for holding a conductor wire in position during assembly, comprising:

a knob having a skeleton section and a flesh section formed around the skeleton section; and a conductor wire having a first end provided within the knob for connecting to a terminal of an electrical component, a base portion spaced from said first end, and a bent portion formed between said first end and said base portion;

said skeleton section having a conductor wire support hole provided therein for receiving said base portion of the conductor wire, said conductor wire support hole having a die-receiving portion adjacent to said base portion of the conductor wire which is open to said base portion to engage and position the base portion of the conductor wire when forming said flesh section, and wherein said flesh section extends into a second portion of said conductor wire support hole and engages and fixes said base portion of the conductor wire.

5. The shift lever device according to claim 4, wherein said flesh section is formed by injecting a molten resin into a forming die.

6. The shift lever device according to claim 4, wherein said skeleton section is formed of a hard synthetic resin.

7. A process of making a shift lever device, comprising the steps of:

providing a knob having a skeleton section with a conductor wire support hole formed therein;

providing a conductor wire having a first end for connecting to a terminal of an electrical component, a base portion spaced from the first end, and a bent portion formed between the first end and the base portion;

inserting the base portion of the conductor wire into the conductor wire support hole and positioning the first end of the conductor wire within the knob for connecting to a terminal of an electrical component;

inserting a part of a forming die into a first portion of the conductor wire support hole to engage and position the base portion of the conductor wire; and forming a flesh section around the skeleton section such that the flesh section extends into a second portion of the conductor wire support hole to engage and fix the base portion of the conductor wire after removal of the forming die.

8. The process according to claim 7, wherein said step of forming the flesh section comprises injecting a molten resin into the forming die.

9. The process according to claim 7, wherein the part of the forming die inserted into the conductor wire support hole has a shorter length than a depth dimension of the conductor wire support hole.

* * * * *